United States Patent [19]

Nakamura

[11] 4,341,675
[45] Jul. 27, 1982

[54] RUBBER COMPOSITIONS CONTAINING ETHYLENE-PROPYLENE-DIENE TERPOLYMERS OR ETHYLENE-PROPYLENE COPOLYMERS AND SILICONES

[75] Inventor: Akito Nakamura, Ichihara, Japan

[73] Assignee: Toray Silicone Company, Ltd., Tokyo, Japan

[21] Appl. No.: 248,161

[22] Filed: Mar. 30, 1981

[30] Foreign Application Priority Data

Apr. 8, 1980 [JP] Japan ................................. 55-46072

[51] Int. Cl.$^3$ ................................................ C08J 3/00
[52] U.S. Cl. ...................................... 524/266; 525/100; 525/101; 525/102; 525/105; 524/264; 524/506; 524/263
[58] Field of Search ...................... 260/29.1 SB, 3; 525/100, 101, 102, 105

[56] References Cited

U.S. PATENT DOCUMENTS

| | | | |
|---|---|---|---|
| 3,497,570 | 2/1970 | Yerrick | 260/29.1 SB |
| 3,870,766 | 3/1975 | Chadha | 525/100 |
| 4,230,826 | 10/1980 | Sommer et al. | 525/100 |
| 4,234,702 | 11/1980 | Nakamura | 525/100 |

*Primary Examiner*—Joseph L. Schofer
*Assistant Examiner*—N. Sarofim
*Attorney, Agent, or Firm*—Roger H. Borrousch

[57] ABSTRACT

A rubber made from a blend of EPDM or EPR and a polydiorganosiloxane gum has strength, heat resistance, and adhesiveness to room-temperature, moisture-curable silicone rubber. The rubber is made from a blend of EPDM or EPR, polydiorganosiloxane gum, a polyorganosiloxane containing aliphatic hydrocarbon radicals of 4 to 20 carbon atoms, a polyoxyalkylene-organosiloxane copolymer or a poly(hydroxyalkyl)organosiloxane, and an organic peroxide.

14 Claims, No Drawings

RUBBER COMPOSITIONS CONTAINING ETHYLENE-PROPYLENE-DIENE TERPOLYMERS OR ETHYLENE-PROPYLENE COPOLYMERS AND SILICONES

BACKGROUND OF THE INVENTION

1. Field of the Invention

This invention relates to rubber compositions containing ethylene-propylene-diene terpolymers (referred to as EPDM) or ethylene-propylene copolymers (referred to as EPR) and silicones.

2. Description of the Prior Art

Various attempts have been made to compensate for the insufficient strength of silicone rubber with EPDM or EPR, and at the same time to compensate for the insufficient heat resistance of EPDM or EPR with silicone rubber. Safford, in U.S. Pat. No. 3,227,777, issued Jan. 4, 1966, describes a mixture of a copolymer of ethylene and propylene, an alkenylpolysiloxane, and an organic peroxide which can be vulcanized to a rubbery material. Falender et al., in U.S. Pat. No. 3,865,897, describes a method of making a blend by mechanically mixing certain polyolefins, such as polyethylene, and a polydiorganosiloxane gum containing vinyl or allyl radicals. The mixing method requires shearing at elevated temperatures to form grafting between the two types of polymers. The resulting blend can be crosslinked by a variety of means including organic peroxide. Falender et al. relate to blends of polydiorganosiloxane gum with thermoplastic polyolefins. Walters, in U.S. Pat. No. 3,979,356, issued Sept. 7, 1976, describes an ethylene-vinyl acetate copolymer blended with silicone elastomer and then cured with organic peroxide.

Betts et al., in U.S. Pat. No. 4,123,586, issued Oct. 31, 1978, describes improving the resistance to flame of ethylene-containing polymers, such as ethylene-propylene copolymers, ethylene-propylene diene terpolymers, ethylene-vinyl acetate, ethylene alkyl-acrylate copolymers, and ethylene-butene copolymers. The ethylene-containing polymers are mixed with fillers, pigments, curing coagents, antioxidants, modifying agents, mold release ingredients, processing aids or lubricants such as lead or zinc stearates in amounts of 1 to 5 parts by weight, and essential ingredients, such as decabromodiphenyl ether, silicone gum in amounts of 3 to 10 parts by weight and dibasic lead. Betts et al. show curing with organic peroxide. Betts et al. also show, in an example for 6.25 parts by weight of silicone gum, a tensile strength retention after heating for seven days at 150° C. of 88%, and an elongation retention of 91%.

As shown above, certain compositions are described where unvulcanized EPDM or EPR is compounded with organopolysiloxane gum or unvulcanized silicone rubber and subsequently vulcanizing the mixture with an organic peroxide. The inventor described in U.S. Pat. No. 4,234,702, issued Nov. 18, 1980, filed Mar. 21, 1979, (Belgium Pat. No. 875,702, granted Oct. 19, 1979) adding an organopolysiloxane possessing a $C_4$–$C_{20}$ alkyl radical to a compounded rubber system consisting of natural or synthetic organic rubber including unvulcanized EPDM or EPR and an organopolysiloxane gum or unvulcanized silicone rubber, and obtaining a compounded rubber composition which exhibits excellent heat resistance and strength, thus overcoming the drawbacks of both polymers.

However, when this compounded rubber is used in industry, it must be adhered to a metallic part or a synthetic resin part using a room-temperature, moisture-curable type silicone rubber. Here, adhesiveness between the compounded rubber and the room-temperature, moisture-curable type silicone rubber is poor and peeling occurs easily. The inventors earnestly investigated the compounded rubbers in an attempt to overcome these drawbacks, and this invention was achieved based on the results of the investigation.

SUMMARY OF THE INVENTION

Adhesiveness, retention of physical properties upon heat aging, and satisfactory mechanical strength have been obtained by making compositions from EPDM or EPR, polydiorganosiloxane gum, a polyorganosiloxane containing aliphatic hydrocarbon radicals having 4 to 20 carbon atoms, a polyoxyalkylene-organosiloxane copolymer or poly(hydroxyalkyl)organosiloxane, and an organic peroxide.

DESCRIPTION OF THE INVENTION

This invention relates to a rubber composition comprising (A) 95 to 5 parts by weight of unvulcanized ethylene-propylene-diene terpolymer or ethylene-propylene copolymer, (B) 5 to 95 parts by weight of a polydiorganosiloxane gum in which the organic radicals are selected from methyl, vinyl, phenyl, and 3,3,3-trifluoropropyl, said organic radicals being at least 50 percent methyl based on the total number of organic radicals, a combination of (A) and (B) being 100 parts by weight, (C) 1 to 30 parts by weight of a polyorganosiloxane based on 100 parts by weight of combined (A) and (B), said polyorganosiloxane having an average unit formula

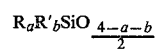

$$R_a R'_b SiO_{\frac{4-a-b}{2}}$$

in which R represents a monovalent radical selected from the group consisting of vinyl, alkyl radicals of 1 to 3 carbon atoms, halogenated alkyl radicals of 1 to 3 carbon atoms, aryl radicals, halogenated aryl radicals, and alkyl radicals of 1 to 3 carbon atoms substituted with an aryl radical, R' represents a monovalent radical selected from the group consisting of aliphatic hydrocarbon radicals having from 4 to 20 carbon atoms and their derivatives in which at least one hydrogen atom is substituted with a chlorine atom or a phenyl radical, a has a value of from 1 to 2.5, b has a value of from 0.01 to 1.2, and the sum of a plus b has a value of from 1.8 to 3, (D) 1 to 30 parts by weight based on 100 parts by weight of combined (A) and (B), of a polymer selected from polyoxyalkylene-organo-siloxane copolymers or poly(hydroxyalkyl)organosiloxanes in which the oxyalkylene contains 2 or 3 carbon atoms, the hydroxyalkyl radicals contain 1 to 8 carbon atoms, the organic radicals are monovalent radicals selected from the group consisting of vinyl, phenyl, phenylethyl, 3,3,3-trifluoropropyl, and alkyl radicals containing 1 to 8 carbon atoms, and at least 50 percent of the organic radicals are alkyl radicals and (E) 0.1 to 15 parts by weight based on 100 parts by weight of combined (A) and (B), of an organic peroxide.

The unvulcanized EPDM or EPR, component (A), used in this invention, can be used as received. However, component (A) including various known additives which have been added to natural rubbers and synthetic rubbers, such as reinforcing fillers, extenders, vulcanization auxiliaries, plasticizers, softening agents, pigments, antioxidants, and flame retardants, can also be used. The types and amounts of these additives are appropriately selected according to the types of unvulcanized rubber used. However, the amounts of EPDM, EPR, or polydiorganosiloxane gum referred to herein implies polymer content per se and does not include other additives.

These unvulcanized rubbers can be used singly or as a mixture of two or more types. The amount of component (A) to be added depends upon which one of the characteristics of component (A) and (B) is expected to be strengthened for a specific purpose. However, component (A) is generally used in a proportion of 95 to 5 parts by weight based on 100 parts by weight of a total of components (A) and (B). EPDM and EPR are well known in the art. EPDM is a terpolymer of ethylene, propylene, and at least one diene. The dienes can be illustrated by ethylidene norbornene, dicyclopentadiene, 1,4-hexadiene, cyclooctadiene, and 5-methyl-2-norbornene. EPR is a copolymer of ethylene and propylene.

The polydiorganosiloxane gums, component (B), used in this invention, are primarily straight chain polydiorganosiloxane having a high degree of polymerization and which are generally expressed by the average unit formula

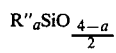

where $R''$ represents methyl, vinyl, phenyl or 3,3,3-trifluoropropyl, the proportion of methyl is 50 mol percent or more based on the total organic radicals, and a has a value of from 1.98 to 2.05. Although the degree of polymerization is not critical, the degree of polymerization preferably ranges from 1,000 or a few thousands to about 10,000. Examples of units constituting the polydiorganosiloxane are the following: dimethylsiloxane, methylphenylsiloxane, diphenylsiloxane, methylvinylsiloxane, phenylvinylsiloxane, and methyl-3,3,3-trifluoropropylsiloxane.

The polydiorganosiloxanes can be homopolymers or copolymers of these siloxane units, or a mixture of these polymers. $R''SiO_{1.5}$ units can be present in a small amount in these structures mentioned above. Examples of end groups of the molecular chain are the following: hydroxy group, alkoxy group, trimethylsilyl group, dimethylvinylsilyl group, dimethylphenylsilyl group and methylphenylvinylsilyl group. However, the end groups are not particularly critical. The preferred polydiorganosiloxanes are those containing dimethylsiloxane units and methylvinylsiloxane units.

Preferably, (A) is present in an amount of 90 to 50 parts by weight and (B) is present in an amount of 10 to 50 parts by weight.

The polydiorganosiloxane gum can be directly added to components (A) and (C), or can be mixed in advance with reinforcing fillers such as fumed silica and precipitated silica, or other ordinary additives prior to mixing it with components (A) and (C).

Polyorganosiloxane, component (C), is an essential component which is capable of forming a homogeneous dispersion by improving compatibility between unvulcanized EPDM or EPR and polydiorganosiloxane gum or unvulcanized silicone rubber, which makes unvulcanized EPDM or EPR and a polydiorganosiloxane gum or unvulcanized silicone rubber co-vulcanize with an organic peroxide, and which is also capable of improving heat resistance of vulcanized rubber.

The polyorganosiloxanes are expressed by the previously mentioned average unit formula. In this unit formula, R represents a monovalent radical, such as vinyl; an alkyl radical of 1 to 3 carbon atoms selected methyl, ethyl, and propyl; aryl radicals such as phenyl and naphthyl, alkyl radicals of 1 to 3 carbon atoms substituted with an aryl radical such as benzyl, β-phenylethyl, 2-phenyl-propyl; halogenated alkyl radicals of 1 to 3 carbon atoms such as 3-chloropropyl and 3,3,3-trifluoropropyl; and halogenated aryl radicals, and $R'$ represents monovalent $C_4-C_{20}$ aliphatic hydrocarbon radicals, such as n-butyl, sec-butyl, t-butyl, n-pentyl, n-hexyl, 3-methyl-pentyl, cyclohexyl, n-heptyl, n-octyl, 2-ethylhexyl, 3,3-dimethylpentyl, n-nonyl, n-decyl, n-dodecyl, stearyl, palmityl, oleyl, and their derivatives in which at least one hydrogen atom in the long chain alkyl group is substituted with a chlorine atom or phenyl radical. In case of the phenyl substituted aliphatic radicals, the carbon atoms in the phenyl radical are not counted for the $C_4$ to $C_{20}$. In the average unit formula for (C), a has an average value of from 1 to 2.5 and b has an average value of from 0.01 to 1.2, such that $a+b$ has an average value of from 1.8 to 3. R is preferably methyl, vinyl, phenyl, or 3,3,3-trifluoropropyl. In this case, b preferably has a value of from 0.1 to 1.2 in terms of improvement in heat resistance. With respect to the molecular structure, those with a straight chain structure or a cyclic structure are preferred. However, those with a slight branched chain structure or a slight three-dimensional structure are also applicable. The end groups of the molecular chain in those with a straight chain structure and a slight branched chain structure can be hydrogen atoms in addition to R and $R'$ groups. The degree of polymerization of (C) can be from 2 to a degree of polymerization sufficient to make this polymer gum-like. Thus, the upper limit of the degree of polymerization is about 10,000. In terms of efficiency, the viscosity at 25° C. of (C) is preferably 0.1 m²/s or less.

The amount of component (C) to be added ranges from 1 to 30 parts by weight based on 100 parts by weight of a total of components (A) and (B). Preferably, (C) is a polyorganosiloxane having methyl and alkyl radicals of from 4 to 20 carbon atoms, a viscosity of 25° C. of 0.00005 to 0.1 m²/s, and is present in an amount of from 1 to 12 parts by weight. If the amount of addition is less than one part by weight, a satisfactory improvement effect on the heat resistance cannot be obtained. On the other hand, if the amount of (C) exceeds 30 parts by weight, the effects on the processability and physical properties of the obtained rubber increase undesirably.

Component (D) used in this invention is an essential component which is capable of adhering the compounded rubber after curing with a room-temperature-curing type silicone rubber. Polyoxyalkyleneorganosiloxane copolymers possessing one or more oxyalkylene units per molecule are applicable as this component. However, the molecular structure and the degree of polymerization are not critical.

Typical examples are those with the following general formulas:

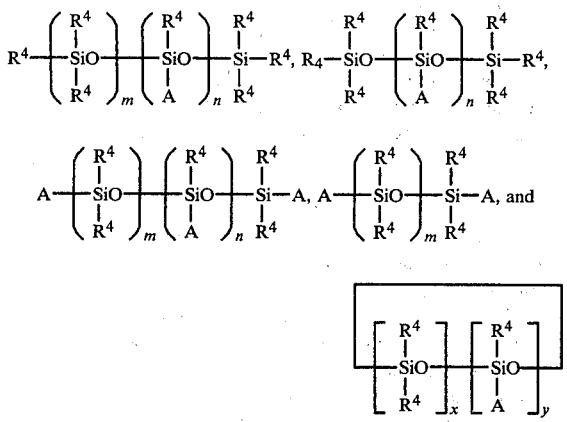

where $R^4$ represents monovalent hydrocarbon radicals or halogenated monovalent hydrocarbon radicals, such as methyl, ethyl, octyl, vinyl, phenyl, phenylethyl and 3,3,3-trifluoropropyl; A represents oxyalkylene groups such as

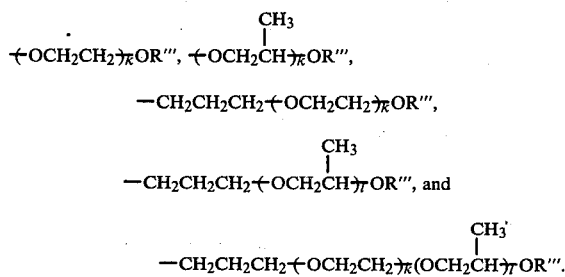

where k and l are integers of 1 or greater, $R'''$ represents a hydrogen atom, or terminal end groups such as alkyl radicals such as methyl, ethyl, propyl, and butyl, and acyl radicals such as acetyl, propionyl, butyryl, and valeryl, m is 0 or integers of 1 or greater, n is integers of 1 or greater, x and y are integers of one or greater such that x+y is from 4 to 8.

Poly(hydroxyalkyl)organosiloxanes possessing one or more hydroxyalkyl radicals per molecule are applicable as this component. However, the molecular structure and the degree of polymerization are not critical.

Typical examples are those with the following general formulas

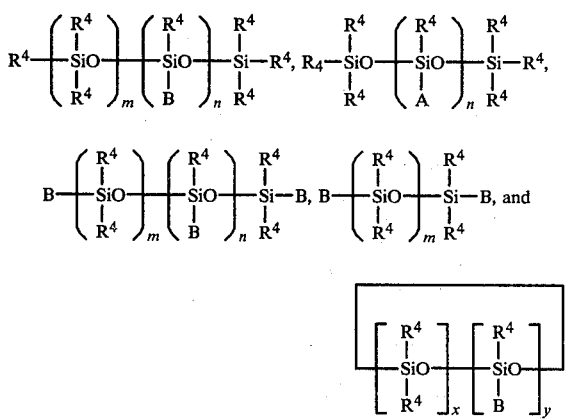

where $R^4$, m, n, x and y are the same as those described previously, and B represents a hydroxyalkyl group, such as 3-hydroxypropyl.

Of course, the applicable examples are not limited by those listed above. However, those which are available in the liquid form at room temperature are preferred and the viscosity at 25° C. is preferably 0.00001 to 0.1 m²/s.

The amount of component (D) to be added ranges from 1 to 30 parts by weight based on 100 parts by weight of a total of components (A) and (B). Preferably, (D) is polyoxyalkylene-organosiloxane copolymer in which the organic groups other than the polyoxyalkylene groups are methyl or a poly(hydroxyalkyl)organo containing dimethylsiloxane units and methyl(ω-hydroxyalkyl)siloxane units. (D) is preferably present in an amount of 2 to 15 parts by weight. If the amount of addition is less than one part by weight, the adhesion effect cannot be achieved. On the other hand, if it exceeds 30 parts by weight, the effects on processability and physical properties of the obtained rubber increase undesirably.

Organic peroxides, component (E), used in this invention can be selected from those which are commonly used for the vulcanization of unvulcanized natural rubbers and synthetic rubbers. Examples include the following: benzoyl peroxide, 2,4-dichlorobenzoyl peroxide, di-tert-butyl peroxide, tert-butyl perbenzoate, dicumyl peroxide, 2,5-dimethyl-2,5-di(tert-butylperoxy)hexane, 2,5-dimethylhexane-dialkyl peroxide, ketal peroxide and 1,1-di(tert-butylperoxy)-3,3,5-trimethylcyclohexane.

The amount of an organic peroxide to be used ranges from 0.1 to 15 parts by weight based on 100 parts by weight of a total of components (A) and (B), preferably from 1 to 10 parts by weight.

The compositions of this invention are obtained by homogeneous blending of five components (A), (B), (C), (D) and (E). As was explained in the description of component (A), the following additives which are commonly added to EPDM and EPR are optional: reinforcing fillers and extending fillers, e.g., fumed silica, precipitated silica, fine quartz powder, diatomaceous earth, carbon black, zinc oxide, basic magnesium carbonate, activated calcium carbonate, magnesium silicate, aluminum silicate, titanium dioxide, talc, mica powder, aluminum sulfate, calcium sulfate, barium sulfate, asbestos, glass fibers, organic reinforcing agents and organic fillers; vulcanization auxiliaries, e.g., metal oxides, amines, fatty acids and their derivatives; plasticizers, e.g., polydimethylsiloxane oil, phthalic acid derivatives, and adipic acid derivatives; softening agents, e.g., lubricating oils, process oil, coal tar, castor oil, beeswax, ricinoleic acid and calcium stearate; antioxidants, e.g., phenylenediamines, phosphates, quinolines, cresols, phenols and dithiocarbamate metal salts. In addition, coloring agents, UV-ray absorbants, heat resistance-imparting agents, flame retarders, foaming agents, scorching inhibitors, viscosity-imparting agents and smoothing agents.

As was explained in the description of component (B), the following additives which are commonly used with silicone rubber are optional: reinforcing fillers and extending fillers, e.g., fumed silica, precipitated silica, fine quartz powder, diatomaceous earth, carbon black, zinc oxide, basic magnesium carbonate, activated calcium carbonate, magnesium silicate, aluminum silicate, titanium dioxide, talc, mica powder, calcium sulfate, barium sulfate, asbestos and glass fibers; inactivators for the reinforcing fillers, e.g., alkoxy endblocked low molecular polydimethylsiloxane, diphenylsilanediol and trimethylsilanol; heat resistance improving agents, e.g., iron oxide, cerium oxide, iron naphthoate, and cerium naphthoate; flame retarders, oil resistance improving agents, foaming agents and adhesiveness improving agents.

The rubber compositions of this invention are produced by a variety of blending methods. For example, component (A) is thoroughly blended and softened in a Banbury mixer, kneader mixer, or two-roll mixer. Subsequently, components (B), (C), and (D) are simultaneously blended in component (A); or component (B) is added and blended at first and then components (C) and (D) are added and blended; or conversely components (C) and (D) are added and blended at first and then component (B) is added and blended. Finally, component (E) is added and blended in the mixture mentioned above. Alternatively, component (A) is softened in the same way as mentioned above and then components (B), (C), (D), and (E) are simultaneously added and blended in component (A). Alternatively, components (A), (B), (C), and (D) are homogeneously blended in the above-mentioned mixers or roll mixer, and then component (E) is added and blended in the mixture obtained. Alternatively, all components (A), (B), (C), (D), and (E) are placed in the above-mentioned mixers or roll mixer, and then simultaneously blended. Alternatively, the whole amount or portion of the additives such as fillers, plasticizers, softening agents, antioxidants, vulcanizing agents, and vulcanization accelerators are compounded in advance with component (A), and then the other four components are added and blended. Alternatively, a mixture which is prepared by compounding in component (A), the whole amount or a portion of the additives such as fillers, plasticizers, softening agents, antioxidants, vulcanizing agents, and vulcanization accelerators; component (B) in which the additives such as reinforcing fillers, fumed silica or wet silica, heat resistance improving agents have been compounded in advance, is added; then components (C) and (D) are added in the above-mentioned mixers or roll mixer; finally component (E) is added and blended in the mixture obtained.

However, methods of addition, order of addition, methods of blending conditions for blending, and blending instruments are not critical. When component (E) is present, the mixture must be blended below the temperature at which component (E) is activated. Each organic peroxide has an activation temperature at which it causes the composition to vulcanize, thus the temperature at which the components are blended with organic peroxide must be below the activation temperature of the organic peroxide to avoid premature vulcanization.

The rubber compositions are vulcanized by heating above the activation temperature of the organic peroxide until a rubber is obtained. The rubber compositions are preferably vulcanized at 80°–200° C. from 3 minutes to 3 hours under elevated pressure 20–200 kg/cm² and, if desirable, further vulcanized at 80°–200° C. from 1 to 48 hours to produce rubber products.

In the rubber compositions of this invention, the insufficient strength of silicone rubber is compensated by EPDM or EPR, while the insufficient heat resistance of EPDM or EPR is compensated by silicone rubber. In addition, a room-temperature, moisture curable type silicone rubber can be adhered. Therefore, the rubber compositions are applicable in a variety of ways such as in the manufacture of belts, rolls, gaskets, packing, hoses, and a variety of small parts. These are the characteristics of the rubber compositions of this invention.

This invention will be explained in the following examples. "Parts" indicated in the examples implies "parts by weight" in all cases. Me represents a CH₃ group.

EXAMPLE 1

On a two-roll mixer, 80 parts of ethylene-propylene-diene terpolymer (EPT 3045, sold by Mitsui Petrochemical Co., Ltd., Tokyo, Japan) was thoroughly blended, and then 40 parts of precipitated silica (Nipsyl NV-3, sold by Nippon Silica K.K., Tokyo, Japan) was added and blended to make a base compound. This base compound was blended with the following ingredients: 20 parts of hydroxyl endblocked polydiorganosiloxane gum having 99.432 mol percent dimethylsiloxane units and 0.568 mol percent methylvinylsiloxane units, and a degree of polymerization of about 5,000, 5 parts of $\alpha,\omega$-bis(trimethylsilyl)methyl n-octylpolysiloxane having a viscosity at 25° C. of 0.0009 m²/s and n-octyl radical content of 50 mol percent based on the total number of organic radicals, 5 parts of polyoxyethylene/methylpolysiloxane copolymer with the formula

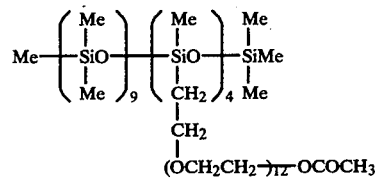

having a viscosity at 25° C. of 0.0005 m²/s, 10 parts of a process oil which is a copolymer of n-butene and i-butene having a viscosity at 25° C. of 20 Pa.s (sold by Nippon Oil and Fats Co., Ltd., Tokyo, Japan), 0.8 part of antioxidant, 5 parts of zinc oxide, 1 part of stearic acid, and 4.5 parts of dicumyl peroxide. The mixture was blended homogeneously in the two-roll mixer and then pressed into sheets with a thickness of 2 mm and vulcanized at a temperature of 170° C. under a pressure of 200 kg/cm² for 20 minutes. The sheets obtained were further heat treated in a hot air circulating type oven at 150° C. for 2 hours. The tensile strength and the elongation at break were measured according to JIS-K-6301 (equivalent to ASTM D 412 for tensile strength and elongation). Separately, a room-temperature-moisture curable type silicone rubber (SH 780, sold by Toray Silicone Co., Ltd., Tokyo, Japan) was coated over the heat treated rubber sheet obtained above and the layer was allowed to stand in the atmosphere at 25° C. for 7 days. According to JIS-A-5755 (equivalent to Military Specification MIS-S-7502), the peeling adhesive strength was tested. As a comparative example, a rubber composition was prepared without adding the polyoxyethylene/methylpolysiloxane copolymer and a rubber sheet was formed under the same conditions as mentioned above. Tests were conducted in the same manner. The results are presented in Table I.

TABLE I

|  | This Invention | Comparative Example |
| --- | --- | --- |
| EPT 3045, parts | 80 | 80 |
| Polydiorganosiloxane gum, parts | 20 | 20 |

TABLE I-continued

|  | This Invention | Comparative Example |
|---|---|---|
| Nipsyl VN 3, parts | 40 | 40 |
| Antioxidant RD*, parts | 0.5 | 0.5 |
| Antioxidant NS-7**, parts | 0.3 | 0.3 |
| Zinc oxide, parts | 5 | 5 |
| Stearic Acid, parts | 1 | 1 |
| Process oil, parts | 10 | 10 |
| α,ω-bis(trimethylsilyl) methyl n-octylpolysiloxane, parts | 5 | 5 |
| Polyoxyethylene/methylpolysiloxane copolymer, parts | 5 | — |
| Dicumyl peroxide, parts | 4.5 | 4.5 |
| Tensile strength (kg/cm$^2$) | 96 | 101 |
| Elongation (%) | 550 | 500 |
| Peeling adhesive strength (kg/25 mm) | 8.9 | 1.2 |

*Antioxidant RD is polymerized, 2,2,4-trimethyl-1,2-hydroquinoline sold by Kawagucki Kagoku K.K., Tokyo, Japan.
**Antioxidant NS-7 is 2,5-di-t-butyl hydroquinone sold by Ohuchi Shinko K.K., Tokyo, Japan.

EXAMPLE 2

On a two-roll mixer, 60 parts of ethylenepropylenediene terpolymer (EP-43 sold by Nippon Gosei Gomu K.K., Tokyo, Japan) was thoroughly blended, and then 40 parts of Nipsyl VN 3 was added and blended thoroughly to produce a base compound. This base compound was blended with the following ingredients: 40 parts of a trimethylsilyl endblocked polydiorganosiloxane gum having 99.858 mol percent dimethylsiloxane units and 0.142 mol percent methylvinylsiloxane units and a degree of polymerization of about 7000, 3 parts of α,ω-bis(trimethylsilyl) methyl n-octylpolysiloxane having a viscosity at 25° C. of 0.0013 m$^2$/s and n-octyl radical content of 50 mol percent based on the total number of organic radicals, 6 parts of polyoxypropylene/methylpolysiloxane copolymer with the formula

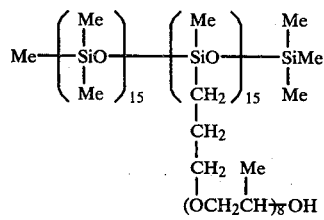

having a viscosity at 25° C. of 0.0008 m$^2$/s, 15 parts of the process oil as described in Example 1, 1 part of antioxidant, 5 parts of zinc oxide, 1 part of stearic acid, 0.5 part of triallylisocyanurate as a vulcanization accelerator, and 6 parts of dicumyl peroxide. The mixture was blended homogeneously on the two-roll mixer. Subsequently, a rubber sheet was vulcanized under the same conditions as in Example 1. The same physical properties were measured according to JIS-K-6301. In addition, the peeling adhesive strength of a laminate of the rubber sheet on which SH 780 was coated, was tested according to JIS-A-5755. Separately, the rubber sheet obtained after the vulcanization was allowed to stand in a hot air circulating type oven at 150° C. for 168 hours and the changes on the surface of the rubber sheet were macroscopically examined. In addition, the tensile strength and the elongation were measured and expressed as residual ratios based on the initial physical values. The results are presented in Table II.

As a comparison, a rubber composition was prepared using 6 parts of polyoxypropylene having a viscosity of 0.0005 m$^2$/s instead of the polyoxypropylene/methylpolysiloxane copolymer and the same tests were conducted. The results are also present in Table II.

TABLE II

|  | This Invention | Comparative Example |
|---|---|---|
| EP-43, parts | 60 | 60 |
| Polydiorganosiloxane gum, parts | 40 | 40 |
| Nipsyl VN 3, parts | 60 | 60 |
| α,ω-bis(trimethylsilyl)methyl n-octyl polysiloxane, parts | 3 | 3 |
| Polyoxypropylene/methylpolysiloxane copolymer, parts | 6 | — |
| Polyoxypropylene, parts | — | 6 |
| Process oil, parts | 15 | 15 |
| Antioxidant MB***, parts | 1 | 1 |
| Zinc oxide, parts | 5 | 5 |
| Stearic acid, parts | 1 | 1 |
| Vulcanization accelerator, parts | 0.5 | 0.5 |
| Dicumyl peroxide, parts | 6 | 6 |
| Initial physical properties | | |
| Tensile strength (kg/cm$^2$) | 81 | 89 |
| Elongation (%) | 430 | 510 |
| Peeling adhesive strength (kg/25mm) | 11.3 | 3.5 |
| After heating at 150° C. for 168 hours | | |
| Appearance | Glossy | Slight Disappearance of gloss |
| Residual tensile strength (%) | 100 | 86 |
| Residual elongation (%) | 97 | 75 |

***Antioxidant MB is 2-mercapto benzimidazole sold by Kawaguchi Kagaku K.K., Tokyo, Japan.

EXAMPLE 3

On a two-roll mixer, 80 parts of ethylenepropylene copolymer (EP-11 sold by Nippon Gosei Gomu K.K., Tokyo, Japan) was thoroughly blended, and then 25 parts of Nipsyl VN-3 was added and blended to make a base compound. This base compound was blended with the following ingredients: 20 parts of trimethylsilyl endblocked polydiorganosiloxane containing dimethylsiloxane units and methylvinylsiloxane units having a degree of polymerization of about 5000, 6 parts of α,ω-bis(trimethylsilyl) methyl n-dodecylpolysiloxane having a viscosity at 25° C. of 0.0006 m$^2$/s and n-dodecyl radical content of 50 mol percent based on the total number of organic radicals, 8 parts of α,ω-bis(trimethylsilyl)methyl(3-hydroxypropyl)polysiloxane having a viscosity at 25° C. of 0.0003 m$^2$/s, having dimethylsiloxane units and methyl-(3-hydroxypropyl)siloxane units where the polysiloxane has a 3-hydroxylpropyl radical content of 5.5 mol percent based on the total numbers of organic radicals, 0.7 part of antioxidant, 5 parts of zinc oxide, 1 part of stearic acid, 1 part of triallylisocyanurate as vulcanization accelerator, and 5 parts of dicumyl peroxide. The mixture was homogeneously blended in the two-roll mixer and a rubber sheet was formed under the same conditions as in Example 1. The strength and the elongation were measured under the same conditions as in Example 1. The adhesive strength with a room-temperature moisture curable type silicone rubber was measured under the same conditions as in Example 1. As a comparative example, a rubber composition was prepared without adding α,ω-bis-(trimethylsilyl)methyl-(3-hydroxy-propyl)polysiloxane and a rubber sheet was formed under the same conditions mentioned above. The characteristics were measured by the same tests. The results obtained are presented in Table III.

TABLE III

|  | This Invention | Comparative Example |
|---|---|---|
| EP-11, parts | 80 | 80 |
| Polydiorgansiloxane gum, parts | 20 | 20 |
| Nipsyl VN 3, parts | 25 | 25 |
| α,ω-bis(trimethylsilyl)methyl n-dodecylpolysiloxane, parts | 6 | 6 |
| α,ω-bis(trimethylsilyl)methyl-(3-hydroxypropyl) polysiloxane, parts | 8 | — |
| Antioxidant BHT****, parts | 0.7 | 0.7 |
| Zinc oxide, parts | 5 | 5 |
| Stearic acid, parts | 1 | 1 |
| Vulcanization accelerator TAIC, parts | 1 | 1 |
| Dicumyl peroxide, parts | 5 | 5 |
| Tensile strength (kg/cm$^2$) | 83 | 98 |
| Elongation (%) | 650 | 580 |
| Peeling strength (kg/25mm) | 9.3 | 2.1 |

****Antioxidant BHT is 2,6-di-t-butyl-p-cresol.

That which is claimed is:

1. A rubber composition comprising
   (A) 95 to 5 parts by weight of unvulcanized ethylene-propylene-diene terpolymer or ethylene-propylene copolymer,
   (B) 5 to 95 parts by weight of a polydiorganosiloxane gum in which the organic radicals are selected from methyl, vinyl, phenyl, and 3,3,3-trifluoropropyl, said organic radicals being at least 50 percent methyl based on the total number of organic radicals, a combination of (A) and (B) being 100 parts by weight,
   (C) 1 to 30 parts by weight of a polyorganosiloxane based on 100 parts by weight of combined (A) and (B), said polyorganosiloxane having an average unit formula

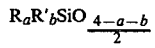

in which R represents a monovalent radical selected from the group consisting of vinyl, alkyl radicals of 1 to 3 carbon atoms, halogenated alkyl radicals of 1 to 3 carbon atoms, aryl radicals, halogenated aryl radicals, and alkyl radicals of 1 to 3 carbon atoms substituted with an aryl radical, R' represents a monovalent radical selected from the group consisting of aliphatic hydrocarbon radicals having from 4 to 20 carbon atoms and their derivatives in which at least one hydrogen atom is substituted with a chlorine atom or a phenyl radical, a has a value of from 1 to 2.5, b has a value of from 0.01 to 1.2, and the sum of a plus b has a value of from 1.8 to 3,
   (D) 1 to 30 parts by weight based on 100 parts by weight of combined (A) and (B), of a polymer selected from polyoxyalkylene-organosiloxane copolymers or poly(hydroxyalkyl)organosiloxanes, in which the oxyalkylene contains 2 or 3 carbon atoms, the hydroxyalkyl radicals contain 1 to 8 carbon atoms, the organic radicals are monovalent radicals selected from the group consisting of vinyl, phenyl, phenylethyl, 3,3,3-trifluoropropyl, and alkyl radicals containing 1 to 8 carbon atoms, and at least 50 percent of the organic radicals are alkyl radicals, and
   (E) 0.1 to 15 parts by weight based on 100 parts by weight of combined (A) and (B), of an organic peroxide.

2. The composition according to claim 1 in which (A) is present in an amount of from 90 to 50 parts by weight, (B) is present in an amount of from 10 to 50 parts by weight, the polydiorganosiloxane gum of (B) has a degree of polymerization of 1,000 to 10,000 and consists essentially of dimethylsiloxane units and methylvinylsiloxane units, (C) is present in an amount of from 1 to 12 parts by weight, the polyorganosiloxane of (C) has a viscosity at 25° C. of from 0.00005 to 0.1 m$^2$/s, R is methyl, R' is an alkyl radical having from 4 to 20 carbon atoms, (D) is present in an amount of from 2 to 15 parts by weight, and (E) is present in an amount of from 1 to 10 parts by weight.

3. The composition according to claim 2 in which the polymer of (D) is a polyoxyalkylene-organosiloxane copolymer in which the organic radicals are methyl.

4. The composition according to claim 2 in which the polymer of (D) is a poly(hydroxyalkyl)organosiloxane consisting essentially of dimethylsiloxane units and methyl(ω-hydroxyalkyl)siloxane units.

5. The composition according to claim 4 in which the ω-hydroxyalkyl radicals are 3-hydroxypropyl radicals.

6. The composition according to claim 3 in which the organic peroxide is dicumyl peroxide.

7. The composition according to claim 4 in which the organic peroxide is dicumyl peroxide.

8. A method of making a rubber comprising (I) thoroughly blending
   (A) 95 to 5 parts by weight of unvulcanized ethylene-propylene-diene terpolymer or ethylene-propylene copolymer,
   (B) 5 to 95 parts by weight of a polydiorganosiloxane gum in which the organic radicals are selected from methyl, vinyl, phenyl, and 3,3,3-trifluoropropyl, said organic radicals being at least 50 percent methyl based on the total number of organic radicals, a combination of (A) and (B) being 100 parts by weight,
   (C) 1 to 30 parts by weight of a polyorganosiloxane based on 100 parts by weight of combined (A) and (B), said polyorganosiloxane having an average unit formula

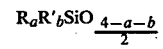

in which R represents a monovalent radical selected from the group consisting of vinyl, alkyl radicals of 1 to 3 carbon atoms, halogenated alkyl radicals of 1 to 3 carbon atoms, aryl radicals, halogenated aryl radicals, and alkyl radicals of 1 to 3 carbon atoms substituted with an aryl radical, R' represents a monovalent radical selected from the group consisting of aliphatic hydrocarbon radicals having from 4 to 20 carbon atoms and their derivatives in which at least one hydrogen atom is substituted with a chlorine atom or a phenyl radical, a has a value of from 1 to 2.5, b has a value of from 0.01 to 1.2, and the sum of a plus b has a value of from 1.8 to 3,
   (D) 1 to 30 parts by weight based on 100 parts by weight of combined (A) and (B), of a polymer selected from polyoxyalkylene-organosiloxane copolymers or a poly(hydroxyalkyl)organosiloxane, in which the oxyalkylene contains 2 or 3 carbon atoms, the hydroxyalkyl radicals contain 1 to 8 carbon atoms, the organic radicals are monovalent radicals selected from the group consisting of vinyl, phenyl, phenylethyl, 3,3,3-trifluoropropyl, and alkyl radicals containing 1 to 8 carbon atoms, and at least 50 percent of the organic radicals are alkyl radicals, and (E) 0.1 to 15 parts by weight based on 100 parts by weight of combined (A) and (B), of an organic peroxide, such that the temperature during the blending process when (E) is present is below the activation temperature of the organic peroxide, (II) heating the product obtained from (I) above the activation temperature of (E) to obtain a rubber.

9. The method in accordance with claim 8 in which (E) is added last.

10. The method in accordance with claim 8 in which the product obtained from (I) is heated at a temperature of from 80° to 200° C. for 3 minutes to 3 hours at a pressure of 20 to 200 kg/cm$^2$.

11. The method in accordance with claim 10 in which the product obtained is further vulcanized by heating at a temperature of from 80° to 200° C. for 1 to 48 hours.

12. A rubber obtained by the method of claim 8.

13. A rubber obtained by the method of claim 10.

14. A rubber obtained by the method of claim 11.

* * * * *